May 14, 1940. F. A. ODDIE 2,200,702
DETACHABLE FASTENER
Filed Dec. 15, 1938 2 Sheets-Sheet 1

Inventor
F. A. ODDIE
by
Attorneys

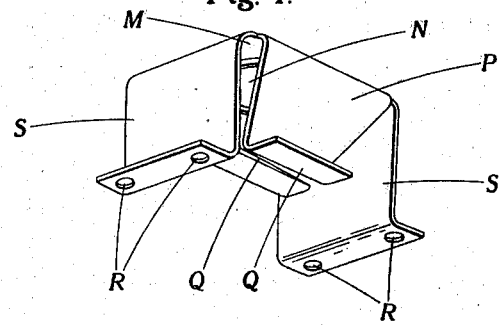
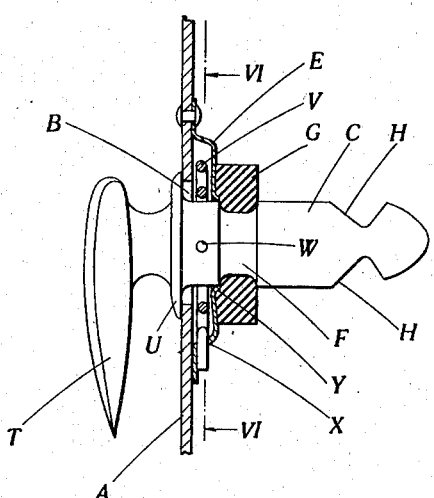
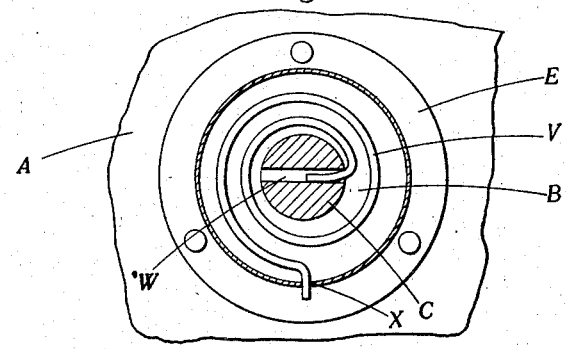

Patented May 14, 1940

2,200,702

UNITED STATES PATENT OFFICE 2,200,702

DETACHABLE FASTENER

Fred Albert Oddie, Southampton, England

Application December 15, 1938, Serial No. 245,991
In Great Britain January 14, 1938

7 Claims. (Cl. 24—221)

This invention relates to fastening devices of the spring socket and rotatable stud type for detachably securing together two parts, and is particularly but not exclusively applicable to fasteners for detachably securing in place aeroplane cowlings, covers for the valve gears of internal combustion engines and similar detachable casings.

The object of the invention is to provide a fastener of simple construction which can be readily assembled, will give a positive connection when it is in its locked position, and while resisting any force tending to bring about disengagement of the two parts, is so constructed that these two parts are immediately separated when the stud is turned to disengage the socket, thereby giving a visual indication that the fastening members are disengaged.

According to this invention a stud and socket fastening device comprises a rotatable stud adapted to be secured to one part and having a substantially conical end portion and shoulder means adjacent to said end portion, and a socket member comprising a support and a resilient tongue extending slantwise from the support towards the conical end portion of the stud, the free end of the tongue forming a lip to engage the shoulder means when the stud is inserted into the socket member and being adapted to cooperate with the conical end portion of the stud to eject the stud when the latter is turned to move the shoulder means out of register with the lip. Preferably two resilient tongues are employed, the free ends of which converge towards the point of the stud and engage shoulder means on opposite sides of the latter near its conical end so that when the stud is turned to move the shoulders out of register with the lips the tongues are separated and the stud is ejected.

Preferably the resilient tongues are formed integral with a common base by which they can be secured to their supporting part. The surfaces of the shoulders adjacent to the point or free end of the stud are inclined to the length of the tongues at approximately a right angle so that the stud, when it is in its locked position, cannot be withdrawn from the socket by a direct pull. Further, these shoulders are preferably so shaped that any pull on the stud, instead of tending to separate the tongues, merely places them in compression so that the tongues further resist any tendency to release their hold.

The shank of the stud is provided with a resilient member adapted to be compressed between the two parts to which the stud and the socket members are secured when the fastening device is in its locked position. This resilient member may also serve to retain the stud in its supporting part and is conveniently formed of rubber or synthetic rubber and preferably comprises a ring fitting into a groove formed in the shank of the stud.

A spring may be provided for maintaining the stud normally in its locking position so as to obviate the necessity for returning the stud to this position by hand before re-insertion thereof.

Two specific constructions according to the present invention are illustrated by way of example with reference to the accompanying drawings.

Figure 4 is a perspective view of an alternative form of the socket,

Figure 5 is a section of another form of fastener, and

Figure 6 is a section of the fastener shown in Figure 5 along the line VI—VI of Figure 5.

Figure 1:
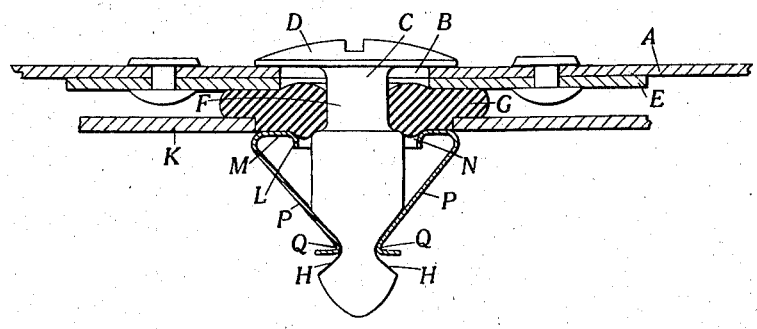
Figure 1 is a section of a fastener in its locked position.
Figure 2:
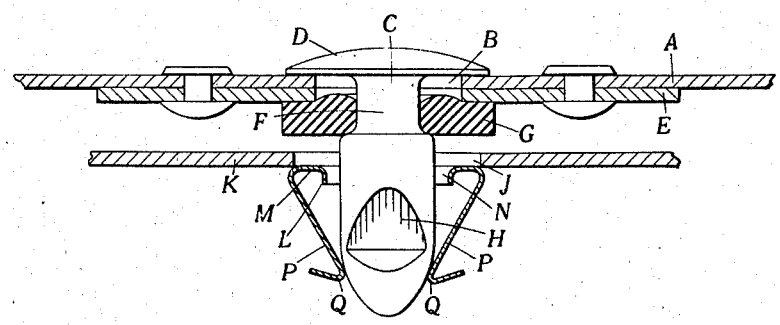
Figure 2 is a section of a fastener in process of detachment.
Figure 3:
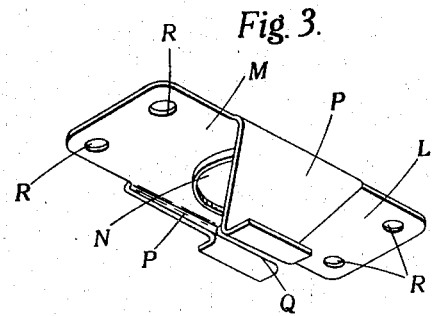
Figure 3 is a perspective view of a socket of the fastener.

In the arrangement shown in Figures 1, 2 and 3 a panel A, constituting for example part of the cowling of an aeroplane engine, is provided with an aperture B through which passes a stud C having a head D adapted to bear against the outer surface of the panel A and provided with a slot or the like so that it can be rotated by a screwdriver, coin or detachable key. Preferably a reinforcing washer E is secured to the panel A. Formed in the stem of the stud C adjacent to the inner surface of the panel A is a circumferential groove F in which lies a ring G of rubber, synthetic rubber or like resilient material which serves to retain the stud C in position in the panel A. The free end of the stud C is of approximately conical form, and in the stem of the stud C adjacent to this conical part is formed a pair of diametrically opposed notches or shoulder means H.

Mounted behind an aperture J in a member K to which the panel A is to be secured is a socket means L intended to receive the stud C. The socket L is conveniently formed from a single metal blank and comprises a plate M, adapted to be secured to the member K, having a hole N in its centre through which the free end of the stud C can be inserted, and a pair of spring plates or resilient tongues P backwardly converging from the sides of the plate M. The ends of the plates P are preferably turned back to form lips Q presenting a rounded surface to the stud and cooperating with the shoulder means C. Conveniently holes R are provided in the strip M to enable the socket L to be secured to the member K by rivets or in any other suitable manner.

An alternative form of socket as shown in Figure 4 is adapted to be mounted on the front of the member K to which the panel A is to be secured. This form of socket does not necessitate the provision of an aperture in the member K. The socket is similar to that shown in Figure 3 except that the plate M is elongated and its ends are bent back as shown to form a pair of brackets S which support the socket in front of the member K.

For some purposes, such as for motor car bonnet fastenings, it is desirable that a permanent handle for rotating the stud should be provided, and that the stud should automatically be returned to its locking position when released from the socket.

Such an arrangement is shown in Figures 5 and 6 in which a stud C is provided with a handle T by which it can be rotated. The stud C passes through an aperture B in a panel A, against the outer surface of which bears a shoulder U. A dished reinforcing washer E is secured to the panel A, and encloses a spiral spring V, one end of which is passed through a hole W in the stud C and the other end of which is passed through a hole X in the side of the dished washer E. The tension of the spring V is such that it tends to return the stud C to its locking position when the latter is turned therefrom. Preferably a lip Y is formed on the washer E to form a bearing for the stud C.

In each case the arrangement is such that when the stud C is in its locking position and is pushed into the socket L the conical portion engages and separates the lips Q, the free ends of which then spring into the notches H so as to lock the stud C and prevent its withdrawal. The notches H are preferably V-shaped so that when the stud is in position the plates P lie along one side of each notch. The angle of the opposite side of each notch H is preferably such that it is at less than or at a right angle to the plates P so that there is no wedging action tending to force the lips Q apart when tension is put on the stud C. The length of the stud C is such that when it is locked the ring G is somewhat compressed between the central part of the socket L and the inner surface of the washer E through which the stud C passes, thus making a liquid-tight joint.

If now the stud C is rotated through 90 degrees it will be seen that the spring lips Q will be forced apart by being brought into engagement with an uninterrupted part of the stud C so as to permit the stud to leave the socket L. As soon as the stud has been rotated through 90 degrees, the lips Q will engage the conical portion of the stud C and force it outwards, assisted by the resilience of the ring G, thus visually indicating that the parts are not properly secured. Also there is no chance of the lips Q inadvertently springing back into the notches H should the stud be turned back to its locking position.

Where a return spring is not provided the outer face of the panel A may be formed to provide an indication of when the stud C is respectively in its locking and its releasing positions so that the stud can readily be turned into its locking position before applying the panel A to its supporting member K, whereupon the stud C on being pushed home into the socket is automatically locked in position.

One important advantage of this invention is that it facilitates rapid production, no accurate lining up of the holes in the panel and support being necessary, as the stud need not be central in the socket or in the panel hole. A further advantage is that the fastening can be applied to curved panels, as the stud can be inserted at an angle, and the resilient ring provides a certain angular freedom for the panel when the fastening is locked.

It will be appreciated that this invention can be employed for other purposes than those mentioned, for example, for securing detachable frames for advertising posters. Also alterations may be made in the arrangements described, for instance, the return spring applied to the arrangement described with reference to Figures 5 and 6 may equally well be applied to the arrangement described with reference to Figures 1 to 3.

What I claim as my invention and desire to secure by Letters Patent is:

1. A fastening device comprising a rotatable stud having a substantially conical end portion and shoulder means adjacent said end portion, a socket means comprising a supporting member and a resilient tongue extending slantwise from said member towards the conical end portion of the stud, the free end of the tongue forming a lip to engage said shoulder means when the stud is inserted into the socket means and being adapted to cooperate with the conical end portion of the stud to eject the stud when the latter is turned to move the shoulder means out of registry with said lip.

2. A fastening device comprising a stud having a substantially conical end portion and a shoulder means adjacent said end, a supporting member in which the stud can be rotatably mounted, a socket means comprising a supporting member and a resilient tongue extending slantwise from the plane of said supporting member towards the conical end of the stud, the free end of the tongue forming a lip to engage said shoulder means when the stud is inserted into the socket means, resilient means adapted to be compressed between the socket means and the stud support when the fastening device is in its locked position, the lip being adapted to cooperate with the conical end of the stud to eject the stud and its support when the latter is turned to move the shoulder means out of registry with said lip thereby to indicate that the two supporting members are not properly secured.

3. A fastening for detachably securing together two members comprising a stud rotatably mounted in one member and a socket member secured to the other member, said stud including a head and shank having a plurality of shoulders and an approximately conical end, said socket means including a plurality of resilient parts, the free ends of which converge to form lips between which the end of the stud can pass, said lips being resiliently urged towards and adapted to engage said shoulder means to prevent withdrawal of the stud when the latter is turned into its locking position and is pushed into the socket means, said stud being adapted when rotated from its locking position to separate the lips clear of the shoulder means and allow them to coact with the conical end to eject the stud.

4. A fastening for detachably securing together two supporting members comprising a stud rotatably mounted in one member and socket means secured to the other member, said stud including a head adapted to bear against the outer surface of its supporting member and a shank having a circumferential groove, a plurality of shoulder means and an approximately conical end, a resilient member fitting into said groove and adapted to bear against the inner surface of the supporting member carrying the stud, a plurality of resilient parts on said socket means, the free ends of said parts converging to form lips between which the conical end of the stud can pass, said lips being resiliently urged towards and adapted to engage said shoulder means to prevent withdrawal of the stud when the latter is turned into its locking position and is pushed into the socket, the stud being adapted when rotated from its locking position to separate the lips clear of the shoulder means and allow the lips to coact with the conical end and cooperate with the resilient material to eject the stud and visually indicate a separation of the supporing members.

5. A fastener as set forth in claim 4 in which the walls of the shoulder means are inclined with respect to the resilient parts at an angle not exceeding a right angle thereby to eliminate a tendency for the lips to be forced apart when the stud is subjected to direct tension, and to separate the lips clear of the shoulder means and eject the stud when rotated from its locking position to permit withdrawal.

6. A fastening for detachably securing together two members comprising a stud rotatably mounted in one member and a socket secured to the other member, said stud including a head adapted to bear against the outer surface of its supporting member and a shank having two oppositely disposed notches and an approximately conical end, a pair of resilient plates on the socket, the free ends of said plates converging to form lips between which the stud can pass, said lips being resiliently urged towards and adapted to engage said notches to prevent withdrawal of the stud when the latter is in its locking position and is pushed into the socket, the notches in said stud being adapted to raise the lips clear of the notches when the stud is rotated from its locking position whereby the stud is ejected by the coaction between said lips and conical end.

7. A fastening device as set forth in claim 1 characterized by the provision on the stud of resilient means adapted to return the latter to its locking position.

FRED ALBERT ODDIE.